UNITED STATES PATENT OFFICE.

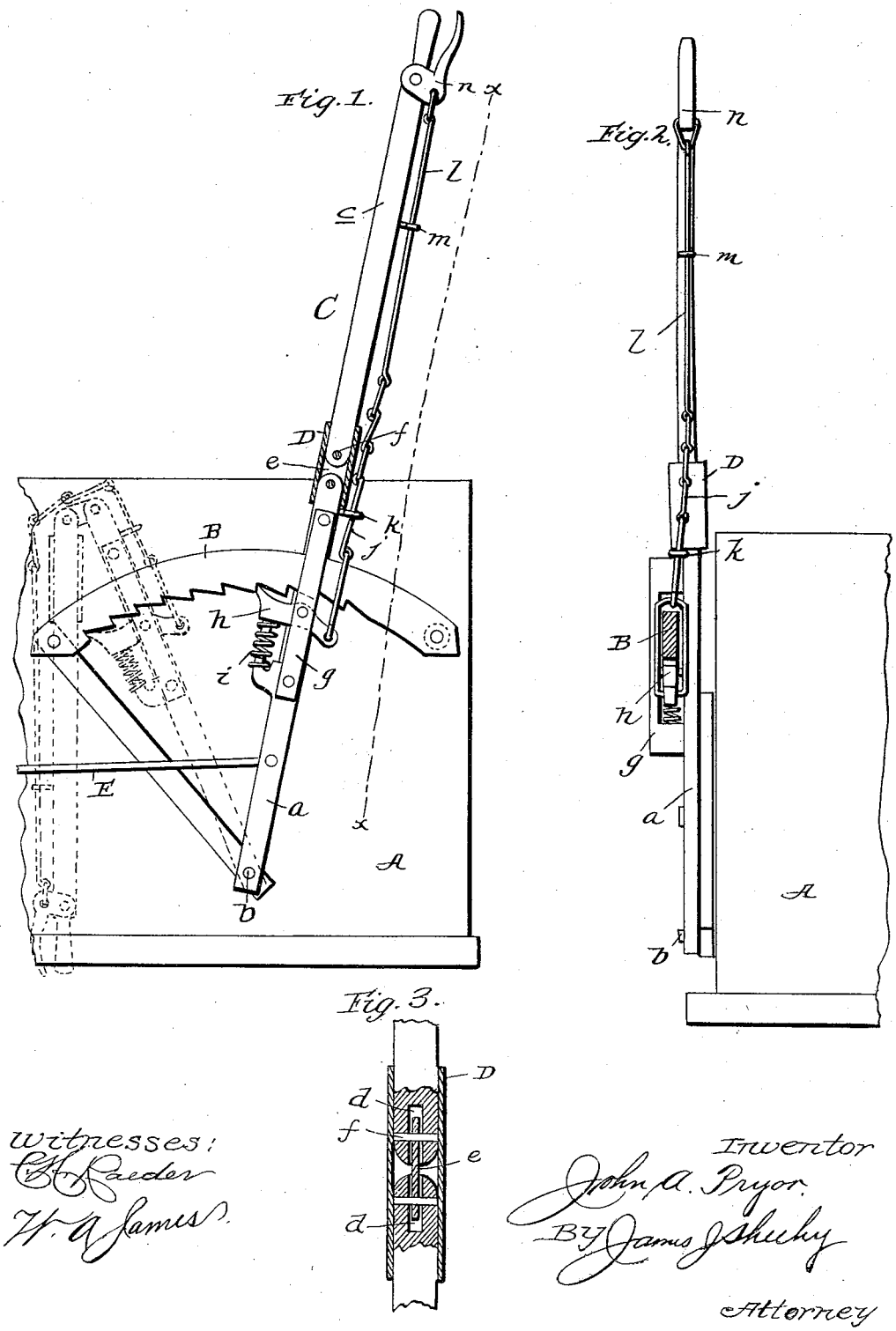

JOHN AARON PRYOR, OF FOLSOMDALE, KENTUCKY.

WAGON-BRAKE.

SPECIFICATION forming part of Letters Patent No. 565,365, dated August 4, 1896.

Application filed March 10, 1896. Serial No. 582,681. (No model.)

*To all whom it may concern:*

Be it known that I, JOHN AARON PRYOR, a citizen of the United States, residing at Folsomdale, in the county of Graves and State of Kentucky, have invented certain new and useful Improvements in Wagon-Brakes; and I do declare the following to be a full, clear, and exact description of the invention, such as will enable others skilled in the art to which it appertains to make and use the same.

My invention relates to wagon-brakes and more particularly to hand-levers for applying and releasing the same; and it has for its general object to provide a cheap and simple brake-lever and one which is long and extends a considerable distance above the wagon-body in order to afford considerable leverage and which is adapted to be readily folded down at the side of the wagon-body and beneath the upper edge of the side wall of the same, so as not to interfere with the same being loaded or unloaded at the side and so that it will not be liable to be broken.

Other objects and advantages of the invention will be fully understood from the following description and claims when taken in conjunction with the accompanying drawings, in which—

Figure 1 is a detail elevation, partly in section, illustrating my improved brake applying and releasing lever in its operative position, the said lever being also illustrated by dotted lines in its folded position. Fig. 2 is a section taken in the plane indicated by the line $x$ $x$ of Fig. 1, and Fig. 3 is a detail section illustrating the manner in which the sections of the hand-lever are connected together.

Referring by letter to said drawings, A indicates a portion of a wagon-body of the ordinary or any suitable construction.

B indicates a segmental toothed rack which is connected to the side of the body A and may also be of the ordinary construction, and C indicates my improved hand-lever. This lever C comprises the lower member $a$, which is fulcrumed at $b$ on the side of the body A and extends up between the rack B and the said body, and the upper section $c$, as illustrated. These sections $a$ $c$ have their contiguous ends slotted, as indicated by $d$, (see Fig. 3,) and they are connected by the link $e$, which is arranged in the slots $d$ and is pivotally connected with the members $a$ $c$ by pins $f$, as shown, so as to permit of the upper member $c$ being folded down, as illustrated by dotted lines in Fig. 1, in order not to interfere with the loading or unloading of the wagon and so as to prevent or reduce the liability of the said lever being broken during such loading or unloading.

The members $a$ $c$ of the lever C are rigidly connected together by the sleeve D. (Better shown in Figs. 1 and 3.) This sleeve D, when in its operative position, surrounds the contiguous ends of the members $a$ $c$ and renders the connection of the said members rigid, so as to permit of the lever being moved to and fro to apply and release the brakes; and, when the wagon is to be loaded or unloaded and it is desired to fold the lever down at the side of the wagon-body for the reasons before stated, it is simply necessary to slide the sleeve D upon the member $c$, as illustrated by dotted lines in Fig. 1.

The lower member $a$ of the lever C is provided with a strap $g$, which rests at the outer side of the rack B, as shown; and between this strap $g$ and the said member $a$ is fulcrumed the detent $h$, which is backed by a spring $i$, and is therefore adapted to normally engage the teeth of the rack B, so as to hold the lever against casual rearward movement and consequently prevent a casual release of the brakes when they have been applied. To the forward end of the detent $h$ is connected the lowermost link of a chain $j$, which extends up through a guide $k$ on the member $a$ to a point above the upper end of the said member $a$ and is connected to the lower end of a rod $l$, which extends up through a guide $m$ on the member $c$ and is connected in turn at its upper end to the handpiece $n$, pivoted on the said member $c$, adjacent to the upper end thereof, as illustrated. In virtue of this construction it will be seen that when the lever C is grasped and the upper end of the piece $n$ is drawn and held against the lever the detent $h$ will be moved out of engagement with the teeth of the rack B, so as to permit of the lever being swung rearwardly to release the brakes.

The lower member $a$ of the lever C is connected to a rearwardly-extending rod E, and this rod is connected with the beam carrying the brake-shoes, (not illustrated,) whereby it will be seen that when the lever is moved forwardly the brakes will be applied and when said lever is moved rearwardly the brakes will be released in the ordinary manner.

The lever C is quite long in proportion and its upper member c extends quite a distance above the wagon-body, as shown in Fig. 1, so as to afford considerable leverage.

When it is desired to fold the lever C, so as to prevent it being broken during the loading or unloading of the wagon and also to prevent it from interfering with such loading and unloading, it is simply necessary to slide the sleeve D up on the member c and then fold the said member c down, as shown by dotted lines in Fig. 1. When it is desired to again use the lever, it is simply necessary to move the member c up into alinement with the member a and then move the sleeve D down to the position shown in Fig. 1, when the members will be rigidly connected and the lever adapted for use in the ordinary manner.

As will be readily observed, the chain connection between the rod l and the detent h permits of the lever C being flexed, as before described, without breaking or impairing the connection intermediate of the handpiece n and the detent h.

With all of its advantages it will be seen that my improved brake-lever may be manufactured and sold almost as cheaply as the ordinary brake-lever.

Having described my invention, what I claim is—

The combination of a wagon-body having vertical side walls, a rack connected to one side wall of the body, a hand, brake-applying lever arranged between the rack and side wall of the body and comprising a lower member fulcrumed on the side wall of the body and having its upper end slotted and adapted to rest below the upper edge of the wall, an upper member extending above the side wall of the body and having its lower end slotted, a connecting-link arranged in the slots of the lower and upper members and pivotally connected to said members, and the movable sleeve arranged on the members, a strap connected to the lower member and arranged outside the rack, a detent fulcrumed between said strap and the lower member, a handpiece pivotally connected to the upper member, and a flexible connection between said handpiece and the detent, substantially as specified.

In testimony whereof I affix my signature in presence of two witnesses.

JOHN AARON PRYOR.

Witnesses:
  C. W. WILSON,
  F. E. PRYOR.